US009298986B2

(12) United States Patent
Ferlatte et al.

(10) Patent No.: US 9,298,986 B2
(45) Date of Patent: Mar. 29, 2016

(54) SYSTEMS AND METHODS FOR VIDEO PROCESSING

(71) Applicant: W-Ideas Network Inc., Toronto (CA)

(72) Inventors: John Charles Ferlatte, North York (CA); Robert James Wilkinson, Toronto (CA)

(73) Assignee: GAMEONSTREAM INC., Toronto, Ontario (CA)

( * ) Notice: Subject to any disclaimer, the term of this patent is extended or adjusted under 35 U.S.C. 154(b) by 365 days.

(21) Appl. No.: 13/708,585

(22) Filed: Dec. 7, 2012

(65) Prior Publication Data

US 2013/0148861 A1 Jun. 13, 2013

Related U.S. Application Data

(60) Provisional application No. 61/568,756, filed on Dec. 9, 2011.

(51) Int. Cl.
 *G06K 9/00* (2006.01)
(52) U.S. Cl.
 CPC ........ *G06K 9/00624* (2013.01); *G06K 9/00724* (2013.01)
(58) Field of Classification Search
 None
 See application file for complete search history.

(56) References Cited

U.S. PATENT DOCUMENTS

| | | | |
|---|---|---|---|
| 6,124,862 A | 9/2000 | Boyken | |
| 6,441,846 B1 | 8/2002 | Carlbom | |
| 6,567,116 B1 | 5/2003 | Aman | |
| 6,707,487 B1 | 3/2004 | Aman | |
| 6,734,911 B1 | 5/2004 | Lyons | |
| 7,327,383 B2 | 2/2008 | Valleriano | |
| 7,483,049 B2 | 1/2009 | Aman | |
| 2002/0030742 A1 | 3/2002 | Aman | |
| 2003/0016368 A1 | 1/2003 | Aman | |
| 2003/0023974 A1 | 1/2003 | Dagtas | |
| 2007/0279494 A1 | 12/2007 | Aman | |
| 2008/0089666 A1 | 4/2008 | Aman | |
| 2008/0192116 A1 | 8/2008 | Tamir | |
| 2008/0219509 A1 | 9/2008 | White | |
| 2008/0219573 A1* | 9/2008 | Lu | 382/236 |
| 2009/0046152 A1 | 2/2009 | Aman | |
| 2009/0153654 A1* | 6/2009 | Enge et al. | 348/61 |
| 2010/0026809 A1 | 2/2010 | Curry | |
| 2010/0134614 A1* | 6/2010 | Aman | 348/135 |
| 2011/0173235 A1 | 7/2011 | Aman | |
| 2012/0017238 A1* | 1/2012 | Miller et al. | 725/32 |

FOREIGN PATENT DOCUMENTS

| | | |
|---|---|---|
| CA | 2467545 A1 | 5/2003 |
| CA | 2351230 C | 6/2010 |

OTHER PUBLICATIONS

Vladimir Plestina et al., "A Modular System for Tracking Players in Sports Games", International Journal of Education and Information Technologies, Issue 4, vol. 3, 2009.

* cited by examiner

*Primary Examiner* — Weiwen Yang
(74) *Attorney, Agent, or Firm* — Norton Rose Fulbright Canada LLP; Maya Medeiros

(57) ABSTRACT

A system and method for processing video is disclosed. The method includes receiving video of an area; determining a movement profile for each of a plurality of movable objects in the video; determining an interest-rating for each movable object of the plurality of movable objects based on a correlation between the movement profile of that object and a template; and identifying a sub-portion of the video based upon the interest-ratings.

27 Claims, 11 Drawing Sheets

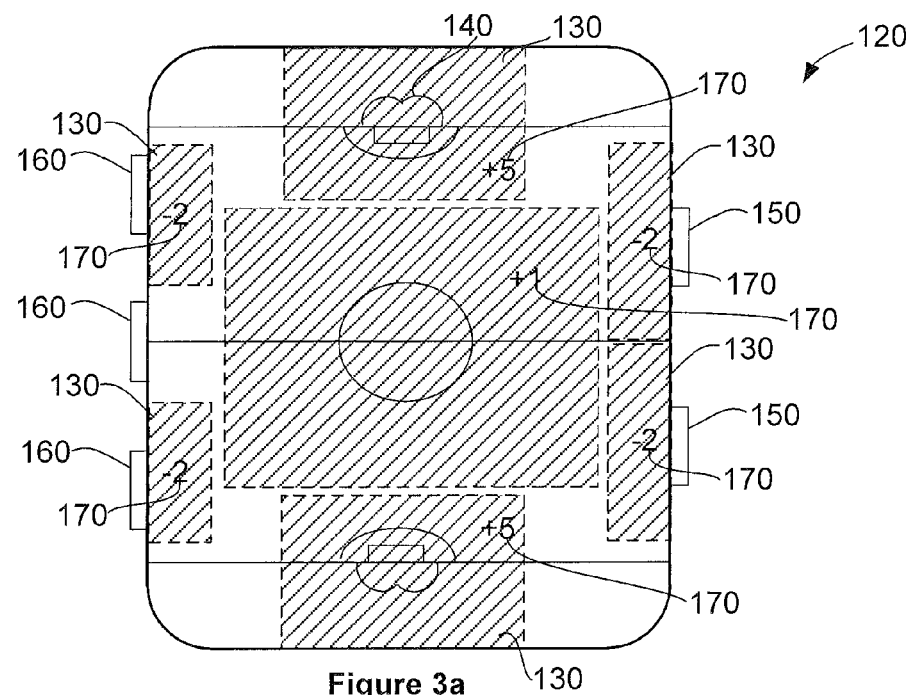
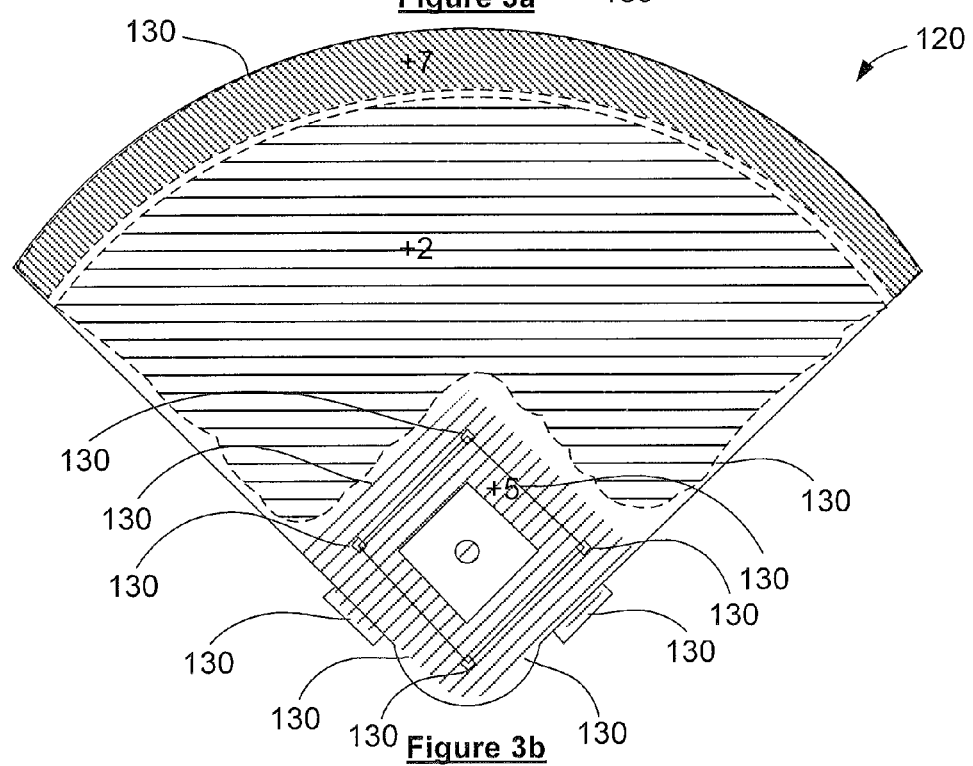

SYSTEMS AND METHODS FOR VIDEO PROCESSING

FIELD

The described embodiments relate to video processing. More specifically, the embodiments herein relate to systems and methods for processing video of an area to identify a portion of interest.

INTRODUCTION

Video cameras can capture an area and an event, and produce video data of the area and event. An example event may be a sporting event, such as a hockey game, baseball game, soccer game, football game, and so on. The videos of the area and event may then be provided to broadcast systems and media networks in order to provide video of the event to interested parties or systems. For example, if the event is a sporting event then interested parties may be fans, coaches, trainers, scouts, analysis systems, processing systems, transmission systems, and so on. It may be difficult to capture events on video especially due to the fast pace and unpredictability of certain events.

SUMMARY

In a first aspect, embodiments described herein may provide a method of processing video comprising: receiving video data of an area (such as for example, a playing area of a sporting event); determining a movement profile for each of a plurality of movable objects (such as for example, players, equipment, referees, spectators, observers of the sporting event) identified in the video data, wherein the movement profile defines the corresponding object's movement within the area; determining an interest-rating for each movable object of the plurality of movable objects based on a correlation between the movement profile of that movable object (as well as using movement profiles of other movable objects) and a template of the area, wherein the template defines regions of the area and associates interest rating factors with the regions of the area, wherein the interest-rating factors are used to determine the interest-rating for each movable object; and identifying a sub-portion of the area based on the interest-ratings. The area may be an area of interest, a predetermined area, a predefined area, a selected area, a defined area, a determined area, a computed area, a chosen area, and so on.

In some embodiments, the video is received from a single camera with a field of view that comprises substantially all of the area of interest. In some embodiments, the video is received from multiple cameras providing a field of view that comprises substantially all of the area of interest. The cameras may have overlapping fields of view, non-overlapping fields of view, partially overlapping fields of view, and so on. The cameras may be arranged in various positions and configurations relative to the area.

In some embodiments, the method may further comprise processing the video data based on the sub-portion of the area to generate a video of the area.

In further embodiments, the received video data comprises a plurality of frames and sub-portion of the area is used for processing the video data to generate a cropped area of each of the plurality of frames.

In some embodiments, the method may further comprise processing the video data based on the sub-portion of the area to generate a video of the area and outputting the video of the sub-portion of the area.

In some embodiments, the plurality of frames of the received video data may have a first resolution, and the cropped area of each of the plurality of frames may have a resolution less than the first resolution.

In further embodiments, the video data may have a first bitrate and the video of the sub-portion of the area may have a second bitrate less than the first bitrate.

In some embodiments, the movement profile of each of the plurality of movable objects includes one or more of position, trajectory, velocity and speed of that movable object.

In further embodiments, interest rating factors are associated with the one or more of the position, the trajectory, the velocity and the speed of that movable object.

In some embodiments, the area comprises a plurality of regions and the template comprises a venue-specific interest-rating factor for each region in the plurality of regions.

In further embodiments, determining an interest-rating for a movable object may comprise comparing a location of the movable object in that movable object's movement profile with the plurality of regions to identify a region; and modifying the interest-rating by the interest-rating factor for that region in the template.

In further embodiments, determining an interest-rating for a movable object may comprise comparing at least one of the position, the trajectory, the velocity and the speed of that movable object and determining the associated interest-rating factor; and modifying the interest-rating by the interest-rating factor for the least one of the position, the trajectory, the velocity and the speed of that movable object.

In some embodiments, determining an interest-rating for a movable object may comprise comparing a trajectory of the movable object in the movable object's movement profile with the plurality of regions to identify a region; and modifying the interest-rating by the interest-rating factor for that region in the template.

In some embodiments, the received video data comprises a first field of view, and the sub-portion comprises a field of view that is less than the first field of view.

In some embodiments, the method further comprises determining additional interest indicia, and the sub-portion of the area is identified based on the additional interest indicia. Examples of additional interest indicia include input received from tracking movable objects, input received from apparatuses affixed to helmets, whistles, Zambonis, equipment or people to determine their position and direction, timing data, sounds, output from systems such as scoreboards, and so on.

In another aspect, embodiments described herein may provide a system for processing video comprising: one or more cameras configured to capture video data of an area; and a processing device comprising: a profiling module configured to determine movement profile for each of a plurality of movable objects identified in the video data, wherein the movement profile defines the corresponding movable object's movement within the area; a rating module configured to determine an interest-rating for each movable object of the plurality of movable objects based on a correlation between the movement profile of that movable object and a template of the area stored in a storage module, wherein the template defines regions of the area and associates interest rating factors with the regions of the area, wherein the interest-rating factors are used to determine the interest-rating for each movable object; and an identification module configured to identify a sub-portion of the area based on the interest-ratings.

In some embodiments, one or more cameras are configured with a field of view that comprises substantially the entire area. In some embodiments, there may be a single camera.

In further embodiments, one or more cameras are configured to capture the video comprising a plurality of frames and the identification module is configured to identify a cropped area of each of the plurality of frames.

In some embodiments, the processing device further comprises a transmission module configured to output a video of the sub-portion of the area generated by processing the video data based on the identified sub-portion.

In some embodiments, one or more cameras are configured to capture the plurality of frames at a first resolution, and the identification module is configured to identify the cropped area of each of the plurality of frames, where each of the cropped areas may have a resolution less than the first resolution.

In further embodiments, one or more cameras are configured to capture the video at a first bitrate and the identification module is configured to identify the sub-portion of the area to generate a video with a second bitrate less than the first bitrate.

In some embodiments, the profiling module is configured to determine the movement profile for each of the plurality of movable objects including one or more of a position, trajectory and speed of that movable object.

In some embodiments, the area comprises a plurality of regions; the template comprises a venue-specific interest-rating factor for each region in the plurality of regions; and to determine the interest rating for each movable object, the rating module is configured to: compare a location of the movable object in that movable object's movement profile with the plurality of regions to identify a region; and modify the interest-rating by the interest-rating factor for that region in the template.

In further embodiments, the area comprises a plurality of regions; the template comprises a venue-specific interest-rating factor for each region in the plurality of regions; and to determine the interest rating for each movable object, the rating module is configured to: compare a trajectory of the movable object in the movable object's movement profile with the plurality of regions to identify a region; and modify the interest-rating by the interest-rating factor for that region in the venue template.

In some embodiments, the camera is configured to capture a first field of view, and the identification module is configured to identify a sub-portion of the video with a field of view that is less than the first field of view.

In some embodiments, the rating module is further configured to determine additional interest indicia, and the identification module is further configured to identify the sub-portion of the area based on the additional interest indicia.

DRAWINGS

Various embodiments will now be described, by way of example only, with reference to the following drawings, in which:

FIG. 1 illustrates an example of a video processing system in accordance with embodiments described herein;

FIGS. 2a, 2b, 2c, 2d, 2e, 2f, 2g, and 2h illustrate example arrangements of camera configurations in accordance with embodiments described herein;

FIGS. 3a and 3b illustrate example templates in accordance with embodiments described herein;

DESCRIPTION OF VARIOUS EMBODIMENTS

Figure 1:
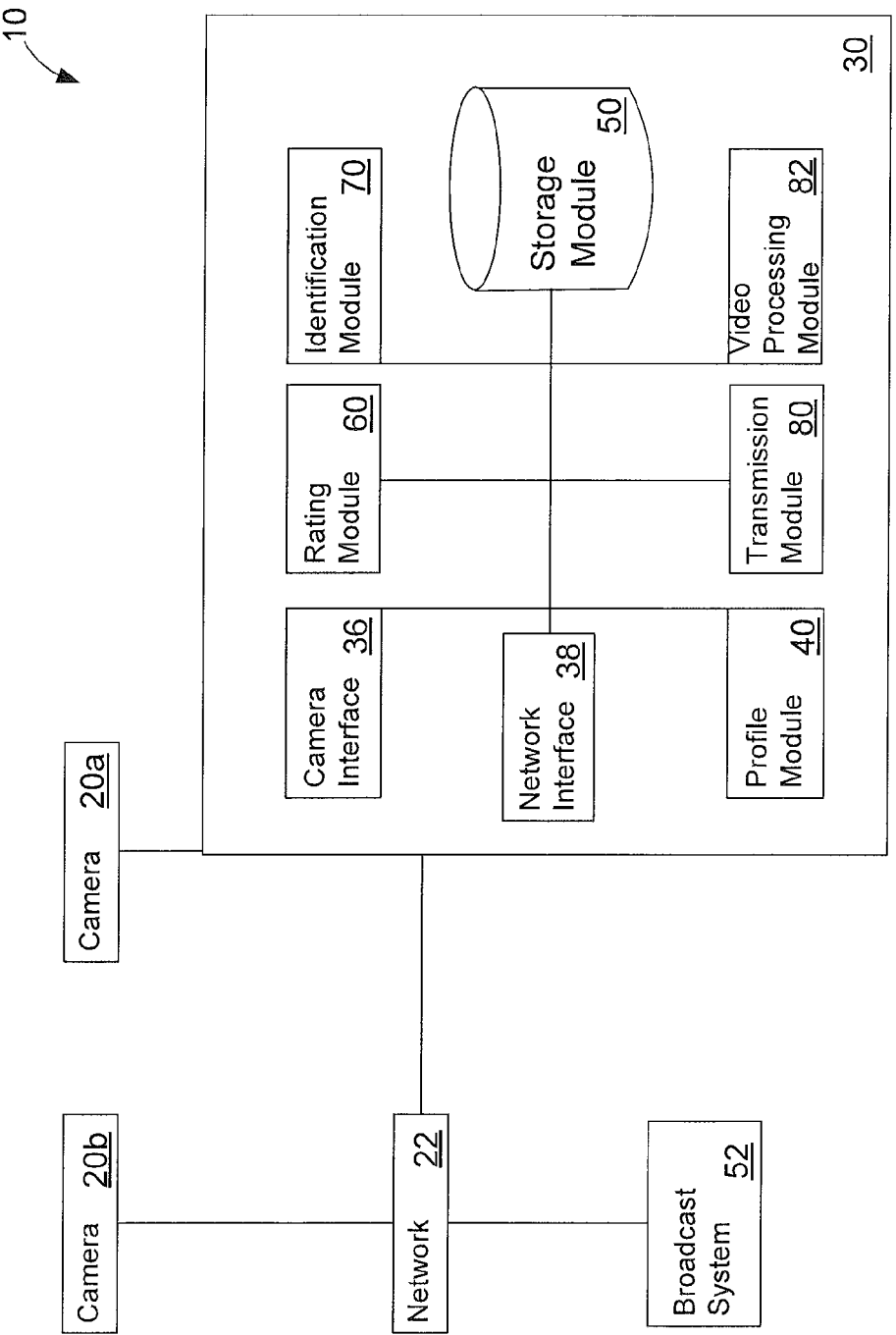

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. These embodiments may be implemented in computer programs executing on programmable computers, each computer including at least one processor, a data storage device (including volatile and non-volatile memory and/or storage elements), and at least one communication interface. For example, and without limitation, the programmable computers may be a server, network appliance, set-top box, embedded device, computer expansion module, personal computer, laptop, personal data assistant, mobile device, cellular telephone, smartphone device, UMPC tablets and wireless hypermedia device or any other computing device capable of being configured to carry out the methods described herein. Program code is applied to input data to perform the functions described herein and to generate output information. The output information is applied to one or more output devices, in known fashion. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g. ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein. Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

Reference is first made to FIG. 1, which shows a first example of a video processing system 10 in accordance with embodiments described herein. As exemplified, the system 10 may include a processing device 30 connected to one more cameras 20a, 20b in order to receive video data (or a video feed) therefrom. By way of example the processing device 30 may be connected to a camera 20a via a direct connection, may be connected to a camera 20b via network 22, or a combination thereof. The processing device 30 may include a camera interface 36, a network interface 38, a profile module 40, a storage module 50, a rating module 60, an identification module 70, a transmission module 80, and a video processing module 82. Although two cameras 20a, 20b are shown there may be more or less cameras 20a, 20b, connected in processing device 30 in a variety of connection configurations in order to obtain video data from the cameras 20a, 20b. For example, processing device 30 may form an integral part of camera 20a. The processing device 30 may include a processor configured to process video data and a data storage device for storing instructions for configuring the processor to process the video.

Processing device 30 may be a server system that has one or more processors with computing processing abilities and memory such as a database(s) or file system(s). Although only one processing device 30 is shown for clarity, there may be multiple one processing device 30 distributed over a wide geographic area and connected via e.g. network 22. Processing device 30 has a network interface 38 which include hardware for connecting to network 22 in order to communicate with other components to receive, process and transmit video data, commands, and other computing applications.

Network 22 may be any network(s) capable of carrying data including the Internet, Ethernet, USB, direct line connection, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), cable, SS7 signaling network, fixed line, local area network, wide area network, and others, including any combination of these.

Figure 2A:
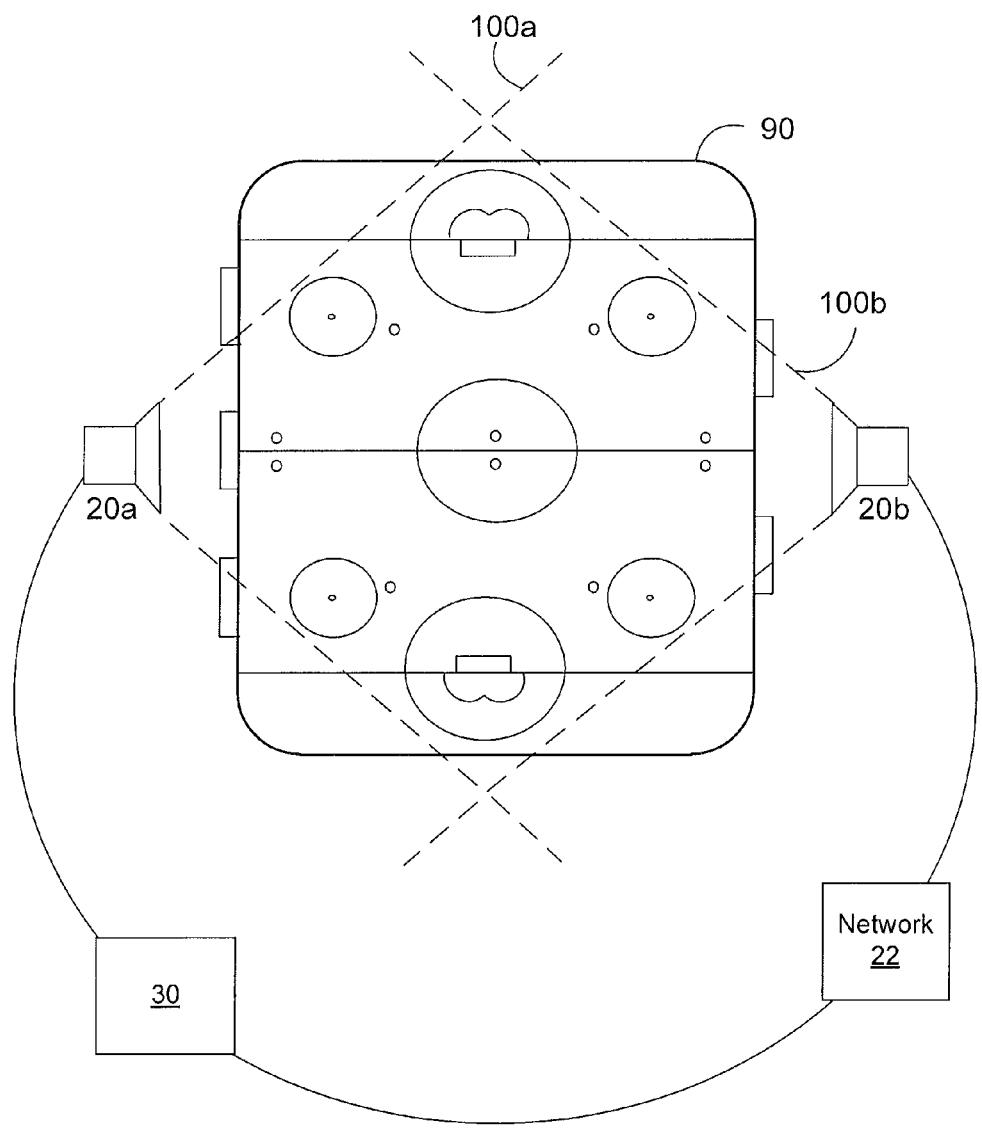

Cameras 20a, 20b are configured to capture movable objects within an area. Movable objects may include people, equipment, aircraft, animals, vehicles, and so on. As an illustrative example, the activity taking place in the area may be a sporting event taking place at a sport venue with a playing area 90 (FIG. 2a) and the cameras 20a, 20b produce video data (or video feed) of the sporting event and players of the sporting event. Other examples include capturing video of people within a city area, capturing video of vehicles or pedestrians on road and walk ways for traffic, capturing video of entertainers in a large complex, capturing video of animals in an observed forest area, capturing video of people in buildings for security, capturing video of people and ancillary, weapons for strategic purposes, and other situations where video of movable objects is captured by multiple cameras. Capturing video or producing a video feed may involve electronically capturing, recording, processing, storing, transmitting, and reconstructing a sequence of still images, or frames, representing scenes in motion. The video feed or video data may be in a variety of formats. FIG. 2a shows an example of cameras 20 capturing a hockey game at an ice hockey arena on playing area 90 that is an ice surface with markings, and producing video data of the sporting event. Cameras 20a, 20b may be a video camera configured for electronic motion acquisition in order to capture the sporting event and produce a video feed of the sporting event. Cameras 20a, 20b may be of the same type or different types of video cameras. For this illustrative example, cameras 20a, 20b may be particularly configured for capturing sporting events such as with HD quality and high-speed capacity to capture action in slow motion, or may be a conventional camera with video recording capability. For example, camera 20a, 20b can be a television studio-grade camera, sports video camera, an HD video camera, a video-capable DSLR camera, a camcorder, real camera, virtual camera, pan tilt zoom camera, a video-capable point-and-shoot camera, computing device, smartphone, mobile device, personal digital assistant, tablet device, and so on. Camera 20a, 20b may have a wired (e.g. a cable system) or wireless connection to processing device 30 or network 22.

FIGS. 2a, 2b, 2c, 2d, 2e, 2f, 2g, and 2h show various configurations of cameras 20a, 20b, 20c, 20d, 20e, 20f, 20g, 20h, 20i, 20j, 20k, 20l, 20n, 20p, 20q, 20s, 20r, 20t, 20y, 20z which may be referred to generally as camera 20. Each camera 20 has an associated field of view 100, which is the extent of the observable world the camera 20 can capture video of at a given moment. That is, the camera 20 is configured to capture video of the observable world within its field of view 100. If the camera 20 moves position or rotates then the field of view 100 in turn may alter. Different cameras 20 may have different field of views 100. In the example shown in FIG. 2a, the field of view 100a of camera 20a may include substantially the entire playing area 90 of the sport venue. Alternatively, one or more camera 20 may have a field of view 100 that is less than or greater than the entire playing area 90 of the sport venue. The range of visual abilities, color vision, and the ability to perceive shape and motion of objects may or may not be uniform across the field of view 100 of a camera 20. For example, camera 20 may have better ability for a visual, shape and motion of a player located closed to the camera 20 than a player located further away from the camera 20 or at a sharp angle to the camera 20. System 10 may use multiple cameras 20 with different fields of views 100 to capture the sporting event, and the multiple cameras 20 may be of different types to capture various aspects of the sporting event.

The camera 20 may capture video that includes a changing field of view 100. That is, the field of view 100 of camera 20 may change while the camera 20 captures video. For example, the camera 20 may be enabled with one or more of pan, tilt and zoom capabilities which may permit the camera 20 to alter its field of view while capturing video. As a further example, the camera 20 may be movable to different positions while capturing the sporting event which may alter its field of view 100. This may include a camera 20 on a cable system.

The camera 20 may have a narrow, standard or wide field of view 100. For example, the camera 20 may be equipped with a zoom lens, wide angle lens or a panoramic accessory which may modify its field of view 100. Additionally, the camera 20 may be configured to support swappable lenses which may also modify its field of view 100. The camera 20 may also be configured to capture audio data of the sounds of the sporting event and associate the audio data with the captured video data. The processing device 30 may also be configured to capture audio, such as the sound of a puck on a hockey stick for example, using analytic techniques, such as capturing audio through multiple devices and locating the source by triangulating between the devices for example.

The camera 20 may capture a field of view 100 with any suitable width-to-height aspect ratio. For example, the camera 20 may capture video with an aspect ratio of 3:2, 4:3, 5:4, 6:9, 7:6, 1:1, 1.85:1, or 2.39:1. Further, the camera 20 may be configured to capture video of a sporting event having any suitable orientation, such as, portrait and landscape or any angled orientation in between. The camera may also be configured with zoom capabilities to change the field of view 100.

Optionally, as shown in FIG. 2a, the system 10 can include a camera 20a with a field of view 100a and another camera 20b with another different field of view 100b. The field of view 100b of the second camera 20b may be substantially distinct from the field of view 100a of the first camera 20a, or may substantially overlap with the field of view 100a of the first camera 20a. In the example shown, an optional second camera 20b has a field of view 100b that substantially overlaps with the field of view 100a of the first camera 20a.

The optional second camera 20b may also have a substantially different perspective, or point of view, than the first camera 20. In the example shown in FIG. 2a, the optional second camera 20b captures video from the perspective of the opposite side of the playing area 90. Alternatively, the second camera 20b may be positioned to capture video with a substantially similar perspective. For example, the second camera 20a may be positioned on the same side of the playing area 90 as the camera 20.

It will be appreciated that the system 10 may include any number of cameras 20, arranged in various configurations with differing, similar, or overlapping fields of view 100 and perspectives. One or more cameras 20 may be overview cameras placed directly overhead of the playing area 90, or any other variant to provide a functional view of the entire playing area 90. One or more other cameras 20 may be in different positions relative to the playing area 90.

Figure 2B:
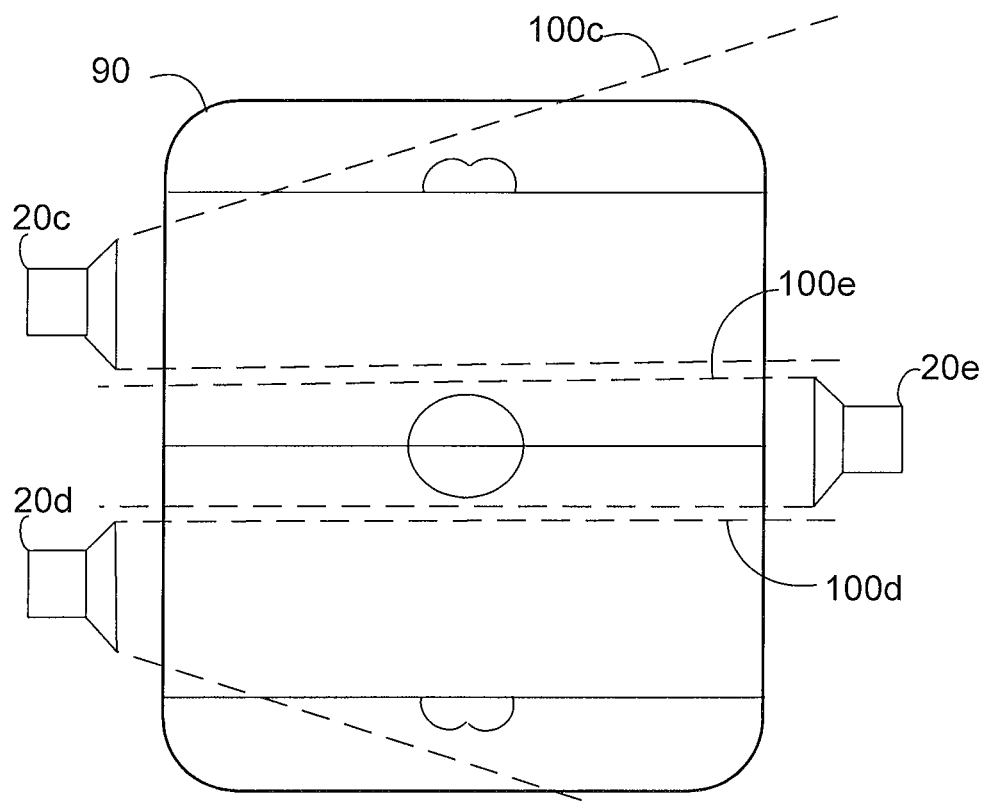

For example, FIG. 2b shows an arrangement including three cameras 20c, 20d, 20e arranged in a staggered configuration. In the example shown, each of the cameras 20c, 20d, 20e have a field of view 100c, 100d, 100e that is substantially non-overlapping with the fields of view 100b of the other cameras 20b.

Figure 2C:
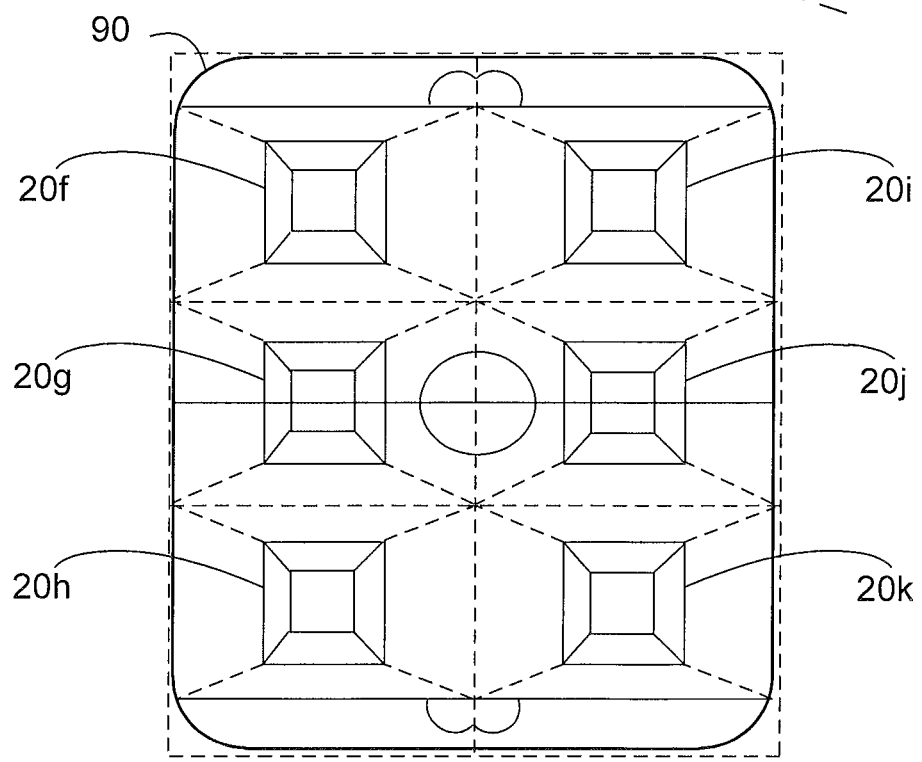

In another example, FIG. 2c shows an arrangement of cameras 20f, 20g, 20h, 20i, 20j, 20k configured in a horizontal array. Each of the cameras 20f, 20g, 20h, 20i, 20j, 20k is positioned overhead of the playing area 90 of the sporting event and has a downward looking perspective of the playing area 90.

Figure 2D:
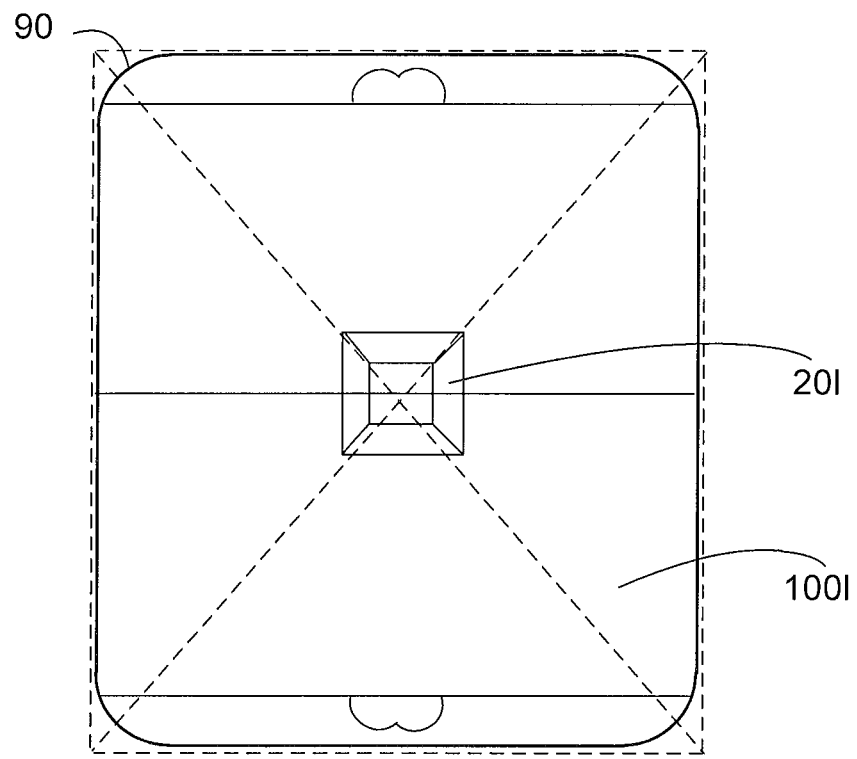

In a further example, FIG. 2d shows a single wide angle camera 20l with a field of view 100l covering substantially all of the playing area 90.

Figure 2E:
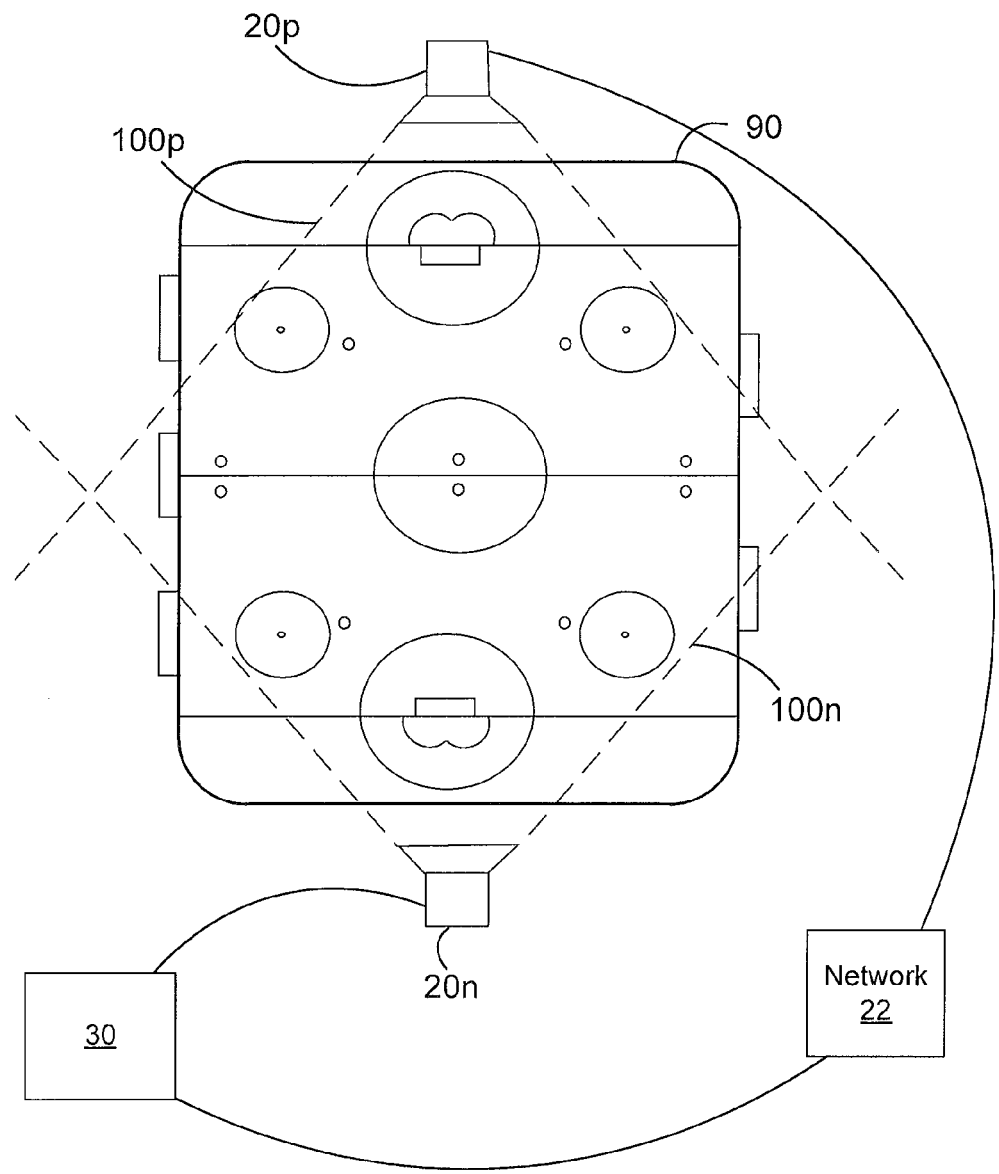

In a further example, FIG. 2e shows an arrangement including two cameras 20p, 20n arranged on opposite ends of the area 90. In the example shown, a camera 20p has a field of view 100p that is overlapping with the field of view 100n of the other camera 20n.

Figure 2F:
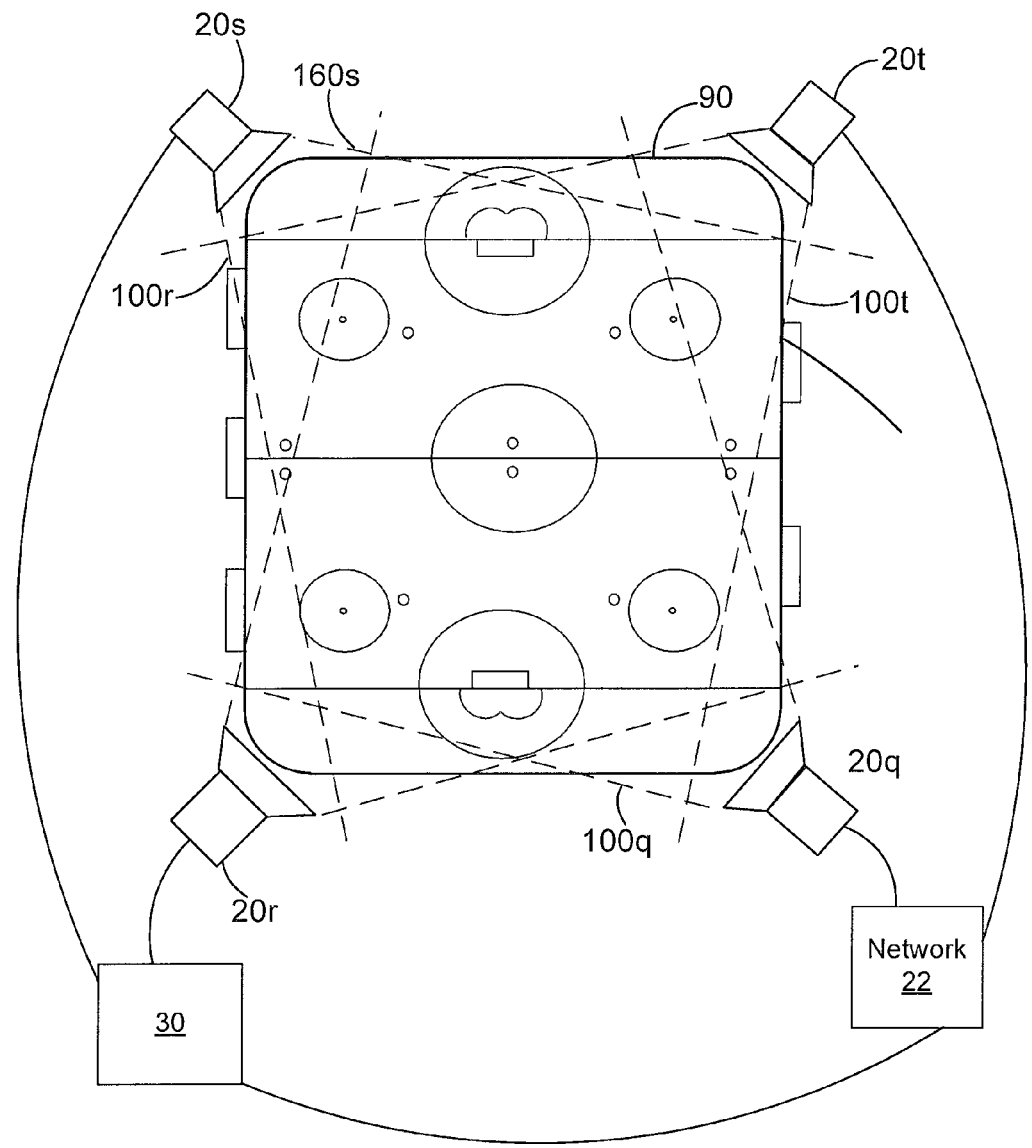

In another example, FIG. 2f shows an arrangement including four cameras 20q, 20r, 20s, 20t arranged on in the four corners of the area 90. In the example shown, the cameras 20q, 20r, 20s, 20t have overlapping fields of view 100q, 100r, 100s, 100t.

Figure 2G:
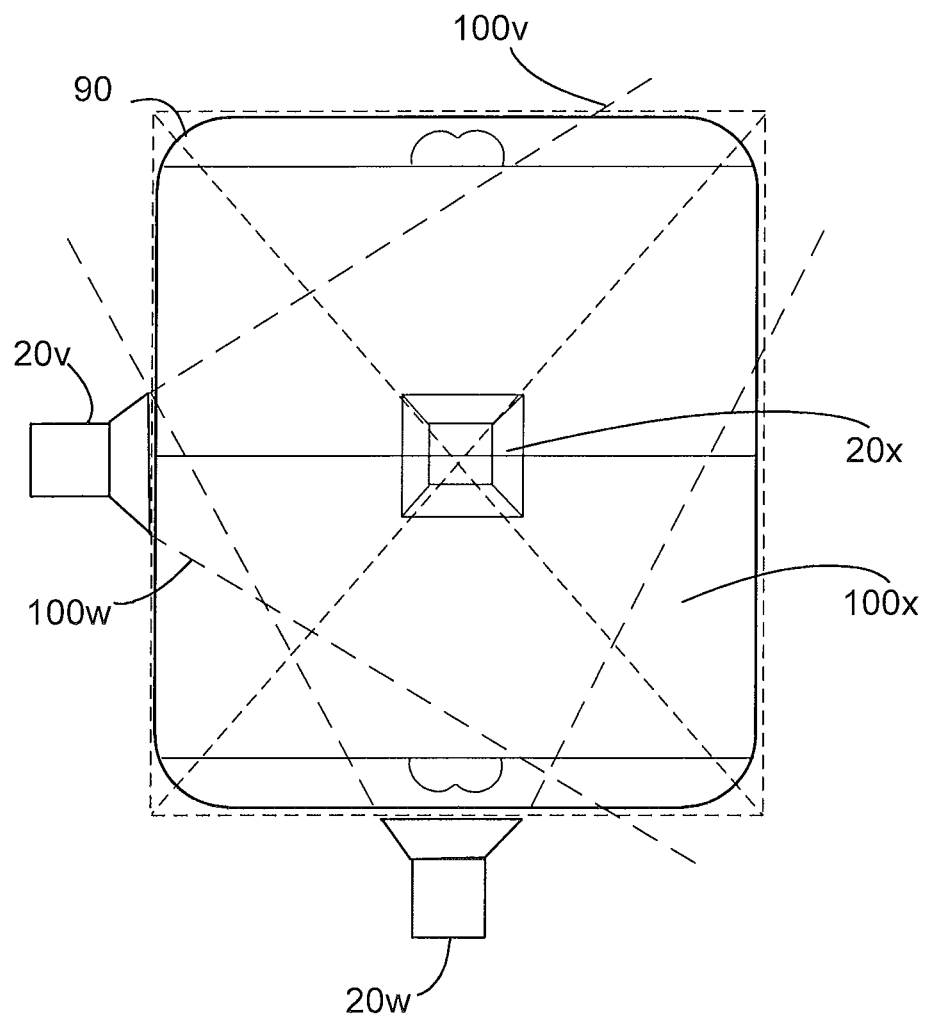

In an additional example, FIG. 2g shows an arrangement including three cameras 20w, 20v, 20x arranged in various positions around the area 90, such as a camera 20x overhead, a camera 20w on an end, and a camera 20v on a side. In the example shown, the cameras 20w, 20v, 20x have partial overlapping fields of view 100w, 100v, 100x. A single wide angle camera 20x may have a field of view 100x covering substantially all of the playing area 90.

Figure 2H:
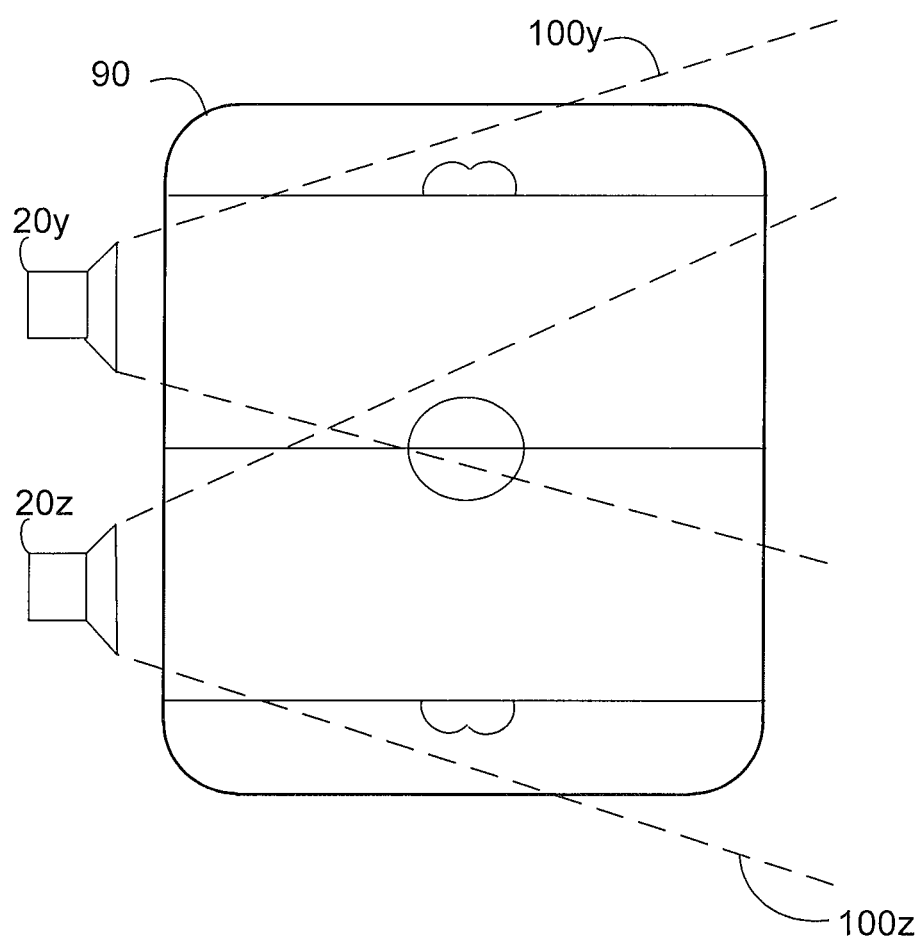

In a further example, FIG. 2h shows an arrangement including two cameras 20y, 20z arranged on the same side of the area 90. In the example shown, a camera 20y has a field of view 100y that is partially overlapping with the field of view 100z of the other camera 20z.

Referring back to FIG. 1, as exemplified, the processing device 30 may be connected to cameras 20a, 20b to receive video data of the sporting event taking place within the playing area 90 of the sport venues. The processing device 30 may have a direct, wireless or wired connection to the cameras 20a, 20b. Further, the processing device 30 may be connected directly or indirectly to the camera 20a, 20b. For example, an intermediary device (not shown) may receive the video data from camera 20b and relay that video data to the processing device 30. Optionally, the intermediary device may be configured to perform pre-processing on the video, such as for example noise-reduction, color enhancement, brightness adjustments, and so on.

In various configurations of the system 10 which include a plurality of cameras 20a, 20b, the intermediary device may aggregate the videos from each camera 20a, 20b into a single video feed for transmission to the processing device 30. For example, where the plurality of cameras 20a, 20b have substantially non-overlapping fields of view, the intermediary device may stitch together the video from each camera 20a, 20b to form a single channel video feed with an enlarged field of view. Alternatively, where the cameras 20a, 20b have overlapping fields of view 100a, 100b, the intermediary device may duplex the video from each camera 20a, 20b to form a single video with multiple simultaneous video channels.

System 10 may use two or more cameras 20 with overlapping fields of view to determine the an optimal or near optimal area of interest of the video to broadcast using the methods described herein (motion patterns, object detection) to compare the three video inputs to provide the best view for the viewer. The three or more cameras may provide for analysis a panoramic view of the entire area of interest (e.g. playing surface) allowing for the determination of the best camera output to use as broadcast.

The processing device 30 may be any suitable electronic computing device. For example, the processing device 30 may be a server, computing device with a processor and memory, desktop computer, notebook computer, server computer, mobile phone, PDA or any other electronic computing device. The processing device 30 may be a specifically configured computing device to efficiently process a large amount of video data. Alternatively, the system 10 may include a plurality of devices which collectively form the processing device 30. For example, the system 10 may include two or more computers, laptops, PDAs, servers and mobile devices each of which perform the same or different functions separately or cooperatively.

In the example shown in FIG. 1, the processing device 30 includes a camera interface 36, a network interface 38, a profile module 40, a storage module 50, a rating module 60, an identification module 70, a transmission module 80, and a video processing module 82.

Figure 4:
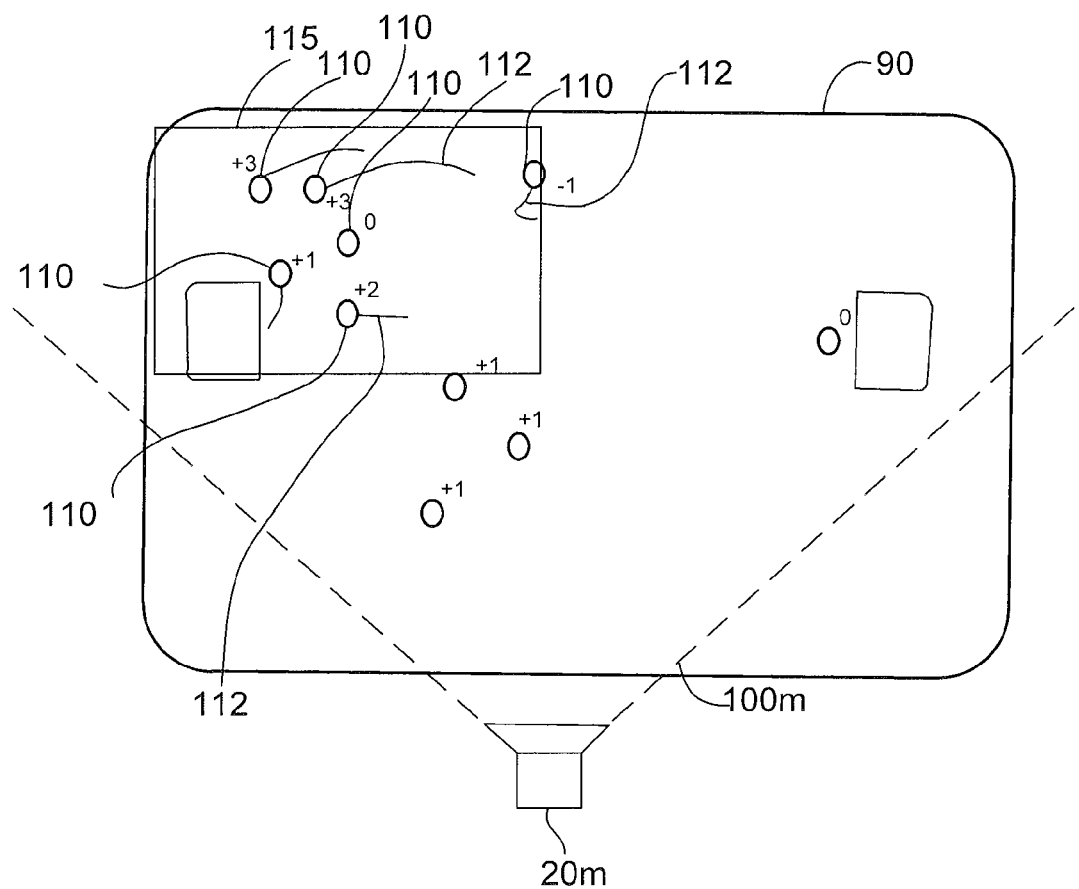
FIG. 4 illustrates an example of a cropped view of a playing area in accordance with embodiments described herein.

Reference is now made to FIGS. 1 and 4. FIG. 4 shows an example of a playing area 90 of the sporting event with players 110.

Generally, system 10 captures, generates and stores movement patterns or profiles defining movement of movable objects within an area, such as for example, players 110 within playing area 90, referees, equipment and so on. System 10 is operable to match the movement profiles against a set of cases to determine an appropriate action related to one or more cameras 20 or otherwise related to the broadcast of the video of the area. For example, an action may be to activate a camera 20 setting such as a pan tilt or zoom function or to select a different camera 30 to provide an end user feed. Cases are made up of movement patterns or profiles, trajectories, exact and relative locations of the playing area 90. System 10 is operable to associate cases with directives to both camera 20 actions and video feeds. For example, when a movement profile of a movable object matches a particular case, the results can be the selection of the best camera 20, instruction to PTZ camera 20, or to select which advertisement to show on the screen below the video. Cases may be given different priorities and can be made active or non-active depending upon the broadcast style desired.

System 10 may include a case testing simulator that may allow a recorded file of overview video to be played in order to test cases mentioned above. The resulting output video may be visually described (e.g., center camera activated, PTZ switched to 56 degrees, display soft drink advertisement) and may be used to re-edit a video of final game play after the fact using raw camera footage captured from same event used as overview input.

The profiling module 40 may be configured to determine a movement profile for each movable object identified in the video data of the area, such as each player 110, one or more referees, equipment (ball, puck, stick) or observers. A movement profile may include a trajectory or path of an object's movement through the area as a function of time. The path may be in two dimensions or three dimensions. The movement profile may be described mathematically either by the geometry of the path, a vector, or as the position of the object over time. The position of the player may be defined by coordinates or a vector, and may be an absolute position or a relative position in respect of playing surface and components thereon, such as a crease, center of the ice, and so on. The movement profile may also include speed or velocity of the object's movement through the area as a function of time, position, and so on. For example, a movement profile may include a vector of velocity and a vector of positions, related by time. In the example shown, an example of a movement profile is illustratively plotted as a trail 112 extending from each player 110.

For example, if the area was a playing area 90 for a sporting event, the profiling module 40 may process video data to track the individual players 110 (or referees, equipment, and so on) to build a movement profile for each player 110. A movement profile may include, for example, one or more of the position, speed, velocity, and trajectory or path of a player 110. Further, a movement profile may include one or more of the position, speed and trajectory of a player 110 at each of a plurality of time points or frames. In the example shown, the trail 112 represents a plot of the corresponding player's position over the course of a period of time, or a plurality of time points. Accordingly, for this example the length of the trails 112 is proportional to the distance traveled by the players 110, as well as the speed or velocity of travel of players 110. Players 110 with shorter trails 112 have travelled a shorter distance during the period of time. The movement profile may relate to an absolute or relative position of the players 110, such as in relation to the playing area 90, previous position, and so on. Equipment may also have an associated movement profile, such as the puck or stick, and people associated with the event such as referees or observers may also have a movement profile. For example, a referee may have a compass on their helmet.

The profiling module 40 is configured to implement analytic technology to track the individual players 110 using a variety of tracking techniques. For example, the profiling module 40 may use a tracking device (e.g. a reflective patch, RFID tag, or GPS) affixed to each of the players 110 to track their movements. Alternatively, the profiling module 40 may be configured to analyze a plurality of video frames to identify the individual players 110 and track their movements without the assistance of tracking devices. For example, the profile module 40 may be configured to identify blocks of pixels representing individual players 110 and may identify differential pixels as blocks. The profile module 40 is configured to assign identifiers to the blocks of pixels representing individual players 110 and track the movement of these blocks of pixels across a plurality of video frames to build movement profiles. The movement profile may also be referred to as a motion signature that captures the distinctive pattern of movement of a particular object. A movement profile or motion signature may be generated based on general views of a scene as opposed to focusing on individual objects. A globing motion of multiple video frames over time will create multiple trails of movement showing direction and time of the objects.

The profiling module 40 may be configured to implement a tracking method using a reflective medium on objects within an area, such as for example rink boards in the context of a hockey game, to quickly detect where players are on playing surface. For example, tracking may be implemented using a color matched adhesive or otherwise secured medium attached to the boards. An infra-red (IR) emitter positioned across the ice surface may transmit a beam of IR light that will then be reflected back to one or more IR filtered camera device positioned to have the reflective material in view. As players skate across the ice surface, between the IR emitter/camera 20 and reflective surface, the filtered camera 20 will see the reflection obscured over part of the field of view and will use this obscured region to determine the position of the players 110 to derive telemetry data regarding position which can then be used to direct a second broadcast camera to follow the play or to allow another broadcast camera to be switched to. Having reflective material on both long sides of the rink boards along with positioning the angle of the emitter and camera lower may enhance the accuracy of the telemetry data by providing a secondary reference that could be used to help determine how far obstructions are on each side.

As further example tracking method, helmet mounted devices may contain an exposed IR LED, which is flashing at a unique frequency to identify each player uniquely. An overhead or side view camera, with a specialized IR filter would detect only the LED's and by virtue of their pulse rate determine which player and which team each player is on. Using this method, a single or multiple cameras can be mounted with a view of the area and profiling module 40 is operable to determine the direction and velocity of each individual object regardless of their proximity to one another. The device may use a fixed battery or may be rechargeable and only need be assigned to individual objects to correlate.

The profiling module 40 may be configured to determine the coordinates of the positions of the players 110 in the venue 90 over a time period for the movement profile. For example, the coordinates may be Cartesian coordinates such as 2D x,y coordinates or the 3D x,y,z coordinates, or other type of coordinates such as polar coordinates, where the position is a point on a plane determined by a distance from a fixed point and an angle from a fixed direction, for example. The coordinates may define an absolute position or a relative position with respect to the playing surface. In order to map positional coordinates to objects displayed in the video, the profiling module 40 may be provided with configuration information of the camera 20 including the camera's position, facing direction or perspective and field of view 10. Where the video captured by the camera 20 has a changing field of view 100 (e.g. the camera 20 has pan, tilt or zoom functionality), the profiling module 40 may be provided with a timeline indicating the position, facing direction and field of view of the camera at each point in time in the video.

The profiling module 40 may be configured to switch between tracking techniques to generate movement profiles. For example, the profiling module 40 may be configured to implement a tracking technique based on motion to keep moving objects in view. As another example, the profiling module 40 may be configured to implement a tracking technique using object placement based on comparison to an image or video of an empty playing area 90 (i.e. a playing area 90 with no players 110). As a further example, the profiling module 40 may be configured to implement a tracking technique based on vector analysis by determining a central point of interest and combining the data with the object placement data to determine an inclusion area of action. As an even further example, the profiling module 40 may be configured to implement a tracking technique based on a combination of speed and vector analysis noting overlaying objects (e.g. players 110 crowding each other).

Further, the accuracy of the movement profile and the coordinate positions of the players 110 may be augmented by using cameras 20 which have at least partially overlapping fields of view for comparison and correlation.

The profiling module 40 may be configured to determine a movement profile for each player 110 including, for example, each player's speed and trajectory, or other metrics such as velocity, distance and direction. The profiling module 40 may determine the speed and trajectory of the players 110 by interpolating, extrapolating, or both, from the coordinate positions of each player 110. For example, the profiling module 40 may determine the speed and trajectory of a player 110 by interpolating the player's 110 coordinate position at each of two or more video frames. Alternately, the profiling module 40 may predict a player's future speed and trajectory by extrapolating from a player's past speed and trajectory at each of two or more video frames.

The profiling module 40 may determine a player's speed and trajectory using a variety of techniques, as described herein. For example, the profiling module 40 may interpret a player's motion blur in the video data to determine their position and trajectory. Further, in examples where the profiling module 40 is assisted by tracking devices, the profiling module 40 may use signals or readings from the tracking devices on the players 110 to determine their speed and trajectory.

The profiling module 40 may generate movement profiles for other objects besides players, such as referees or spectators, for example. For example, the profiling module 40 may integrate puck movement into existing motion tracking object detection to improve accuracy of play tracking. To enhance the tracking of by profiling module 40 the telemetry of the puck may be determined and added to the data stream of existing analytics to determine the best viable broadcast angle by embedding circuitry to embed a rugged circuit and IR Light Emitting Diode, and so on.

As noted above, the profiling module 40 may be further operable to track objects within playing area 90 such as sporting equipment. For example, the profiling module 40 may track the position and movement of a puck for a hockey game. By providing a thin laminate coating or covering to the puck with infrared (IR) reflective qualities such as to allow it to illuminated through IR frequencies that can then be filtered to a camera 20 making it the only visible for tracking purposes. The same covering could be placed at strategic positions within the facility to allow the triangulation of the pucks position to determine the best camera 20, or camera 20 position for recording and broadcasting. Additional, other objects could be coated or covered allowing for additional telemetry to be used for tracking, differentiated by reflective qualities using different frequencies and comparing to the above. Other locator techniques include global positioning systems, and other wireless locator systems.

The profiling module 40 may implement multiple tracking techniques such as by creating a gird or series of unbroken beams of light over the area. As beams are broken it provides information to a backend process to determine location of the play or object. As an additional example, when an object in field of view of a camera 20 (e.g. puck) then processing device 30 may control attributes of object like change colour, highlight, enhance, and so on.

The rating module 60 may be configured to determine an interest-rating for each movable object, such as a player 10. The interest-rating is a metric which corresponds to an estimate of a level of interest in a given player and a given time in the sporting event. For example, a player quickly moving towards the goal may have a higher interest rating then a player slowly moving towards the bench. The interest-rating may be determined based on a variety of interest-rating factors such as position or location within the playing area 90, speed or velocity, location within a predefined area, direction of movement, time lapsed in the sporting event, proximity to other objects, the stage of game play, the identity/personality of a player 110 and so on. The rating module 60 is configured to aggregate metrics for multiple interest rating factors to compute an overall interest-rating for a given player. The rating may also be based on the position of an object relative to other objects. For example, if a group of players gathers together in the center of the area then this may be an additional interest indicia.

The rating module 60 may be configured to compute an interest-rating for each player by correlating the movement profile of each player 110 with a template 120 (FIGS. 3*a* and 3*b*) of the playing area 90 for the venue. A template 120 may define locations within the playing area 90 and provide context for various locations or regions within the playing area 90 such as the bench, the goal, boundaries of the playing area 90, and so on. A playing area 90 may have one or more corresponding templates 120. One or more templates 120 may be stored in the storage module 50 for access by rating module 60 for use in determining an interest-rating for each player 110. In some embodiments, the rating module 60 may only compute interesting-ratings for those players that are located within the playing area 90 which may represent that those players are currently participating in the sporting event, and may assign a default interest-rating to those players that are not currently participating in the sporting event. As a simplified example, the template may indicate that a bench area is not of interest and an area by the goal is of greater interest to distinguish between a situation where a group of players gathers by the bench and another group of players gathers by the goal area, where the latter is determined to be of greater interest.

The rating module 60 is operable to consider additional interest indicia to determine the portion of the area of interest. Using an apparatus mounted to multiple referee helmets, attached to cap visor of spectators or mounted as an earpiece. The apparatus will provide a directional signal to a receiver that will notify the rating module 60 of their location and direction of view, from which to determine the highest interest direction to relay to the broadcast system. By using multiple apparatuses, communicating to a profiling module (or other component of processing device 30) using either radio frequency or infrared transmission, the rating module 60 can analyze the data sent from the units to determine their positions and directions of view. By comparing the data from multiple units, the rating module 60 determine, by a voting algorithm in which portion of the area (e.g. rink, playing surface) is of most interest, and provide input to an identification module (or other component of processing device 30) to then broadcast that portion of the playing surface or identify that portion as the sub-portion of the area of interest. A version of the above can be also used by a single designated operator in a close proximity environment using a head mounted device in coordination with a near mounted receiver (IR/RF) to allow the directionality of the play to be sent to the system to direct the camera selection/position to the area of interest on the playing field. Head movement would be detected in position of left and right as well as up and down, where left and right would direct the panning of a camera or the switching to an area specific camera, and the up/down movement would direct the system to either tilt the camera or switch to an area specific camera.

The storage module 50 is a storage device with memory and may be organized as a database, file system, and so on. For example, the storage module 50 may be a hard drive, a compact disk, a tape drive, a solid state drive, a random access memory module, or a flash drive. Further, the storage module 50 may be replaced with or supplemented by a cloud storage service which stores data across a plurality of remote server computers over a network 22. The storage module 50 is operable to store both low and high quality video to provide the user with the ability to review previous event footage while the game is still being played or directly after. This footage may be later upgraded with higher quality footage sent up to a streaming server later on as bandwidth is not being used for live feed.

An object's interest-rating may be a metric representing an estimation of the interest a viewer of the event may have in viewing a particular player 110 at a particular point in time. The value of the interest rating may be proportional to the estimated level of interest in the player. For example, in a hockey game, a player that is skating at high speed towards a net 140 may have a relatively high interest-rating as compared with a player that is skating slowly towards a penalty box 160 or his team's bench 150. As noted herein, additional interest indicia may be factored in to determine the object's interest rating.

An object's interest rating may change over the course of the event and the video. For example, in a baseball game, a player 110 may be at one point in the event running at high speed toward home plate, and be accorded a high interest rating. At another point in the game, the same player 110 may be seated on his team's bench and be accorded a low interest rating. Rating module 60 is configured re-compute interest-ratings for movable objects reflecting that interest ratings for objects change over the course of the time of the video. Rating module 60 may periodically re-compute interest-ratings or may re-compute interest ratings in response to the occurrence of an event.

Rating module 60 may access a player's movement profile (which may include the player's coordinate position, speed, trajectory for example) and then may correlate an object's movement profile with a venue template 120.

The venue template 120 may be stored in the storage module 50. The storage module 50 may be configured to store one or more venue templates 120. Referring now to FIG. 3a, an illustrative venue template 120 is shown. In the example shown, the venue template 120 includes regions 130 which have associated interest-rating factors 170. For example, a region proximate to the players bench 150 may have a metric of −2 for an interest rating factor 170, and a region proximate to the net 140 may have a metric of +5 for an interest rating factor 170.

Interest-rating factors 170 modify the interest ratings of objects (e.g. players 110), as the rating module 60 is operable to aggregate various metrics for interest-rating factors 170 to determine an overall interest rating, including factoring in various additional interest indicia. In the example shown, a positive interest rating factor 170 may increase the interest rating of a player 110 and a negative interest rating factor 170 may decrease the interest rating of a player 110. In this example interest rating factors 170 are represented by positive and negative integers, however, that the interest rating factors 170 may take any form which is suitable for modifying the interest rating value of a player 110. For example, an interest rating factor 170 may be an integer, real number, a mathematical equation, and so on.

The rating module 60 may be configured to modify the interest rating of moveable object (e.g. a player 110) by the interest-rating factor 170 of a region 130 of the playing area 90 if the player 110 is present in the region 130 or if the player 110 is headed towards the region 130. For example, the rating module 60 may modify the interest rating of a player 110 present in or headed towards the region 130 closest to the net 140 according to the interest rating factor 170 associated with that region 130.

In the example shown, the regions 130 which are closest to the nets 140 have interest-rating factors 170 that are greater than the interest-rating factors 170 of the regions 130 closest to the team benches 150. This represents an estimation that player activities associated with the nets 140 may be more interesting to viewers generally than player activities associated with the team benches 150. This is an example only and other configurations are possible, such as for example assigning a higher interest rating factor to the region associated with the team benches 150.

As an example scenario, a player 110 in a hockey game positioned at center ice may be travelling at high speed towards the opposing team's net 140. In this example, the rating module 60 may assign a preliminary high interest-rating to the player 110 based on his speed alone. Alternatively, the rating module 60 may assign a preliminary interest rating to the player 110 based on his speed and other factors such as the movement profiles of other players, the point of time in the game (e.g. end of third period), other interest rating factors (e.g. no goalie in the opposing team's net), and so on.

The rating module 60 may modify that object's interest-rating based on the coordinate position and trajectory of the player 110. For example, the rating module 60 may cross-reference the template 120 to identify the region in which the player 110 is located and the region in which the player 110 is headed towards. In this example, the interest rating module 60 may modify the player's interest rating using one or more of the interest rating factors 170 of the center region 130 and the interest rating factor 170 of the region 130 near the net the player 110 is headed towards.

In some configurations, the rating module 60 may be configured to modify interest ratings based on the interest rating factor 170 of both the region 130 that the player 110 is currently located and the region 130 that the player 110 is headed towards, one of the interest rating factors may be weighted greater than the other. For example, when aggregating both interest rating factors 170, the interest rating factor 170 associated with the trajectory of the player 110 may be weighted, such as for example weighted to a fixed percentage (e.g. 50%). This may account for the relative uncertainty of the player's true trajectory.

Alternatively, the weighting of the interest rating factor 170 associated with the trajectory of the object (e.g. player 110) may be weighted according to the proximity of the object (e.g. player 110) to the region 130 the object (e.g. player 110) is headed towards. In a further alternative, the template 120 of the playing area 90 may include an interest rating factor 170 for every combination of position and direction of a movable object. In still a further alternative, the template 120 may have separate interest rating factors 170 (or equations to derive them) for each combination of position, trajectory and speed of a movable in the playing area 90.

It will be appreciated that the template 120 shown illustratively in the FIGS. 3a and 3b as examples, and other configurations for templates 120 for the same or different areas may be used by processing device 30. The template 120 may be implemented and stored in the storage module 50 in any suitable format and configuration. For example, the template 120 may be stored as a collection of coordinates, radii and other measurements. As another example, the template 120 may be stored as an image encoded with colors or other indications to represent regions 130 and their corresponding interest rating factors 170. As a further example, the template 120 may be stored as one or more mathematical equations. For example, the template 120 may provide for a discrete interest rating factor 170 for every coordinate position in the playing area 90 instead of including area regions 130 inside which all coordinate positions share an associated interest rating factor 170.

The rating module 60 may determine the interest rating factor of a movable object by cross-referencing a plurality of interest rating factor, such as contextual factors. For example the rating module 60 may determine the interest-rating of a player 110 based upon the movable object's movement profile, the template 120, the stage of game play (e.g. end of $3^{rd}$ period), the identity/personality of a movable object 110 (e.g. a fighter in hockey, or a base stealer in baseball), and the relative positions of other movable object (e.g. the player 110 is on a collision course with another player 110).

The storage module 50 may be configured to store one or more template 120 for each venue type (e.g. ice hockey arena). The storage module 50 may be configured to store different templates 120 for some or all of the areas (e.g. playing areas 90) of a venue type. The storage module 50 may be configured to store different templates 120 tailored to specific areas. For example, the outfield in some baseball stadiums extends further than others. Accordingly, the storage module 50 may store a template 120 tailored for each individual baseball stadium accounting for the difference in outfield size, and other regions in the playing area. Templates 120 may be modified to change the regions, interest rating factors, dimensions, and so on. In another example, the locations of the various elements or object of an ice hockey playing area 90 (e.g. player benches 150, the penalty boxes 160, the nets 140 etc.) may be substantially consistent from ice hockey arena to ice hockey arena such that the storage module 50 may store just one template 120 for use with playing areas for many or all hockey arena locations.

Additional techniques may be used to determine interest-ratings. For example, forensic analysis techniques may be used by processing device 30 that may allow for manual correction of the captured data and processing device 30 may be configured to implement learning techniques to learn based on such manual correction. The learning technique may then process a number of frames of video before and after such manual correction to determine the suitability of a method or correction to identify additional contextual factors such as recognizing a shootout or a penalty shot. Processing device 30 may note the position of or configuration of objects (or players 110) within a video frame and receive as input a drawing of an outline of the view field representing the contextual data. The next time the processing device 30 recognizes a similar configuration of objects (or players 110) it would use the same view field as drawn, where the view field may be used as the sub-portion of video.

It will be appreciated that the system 10 may be configured to process video of different types of events, sport events, and for different areas and venues. The storage module 50 may store templates 120 for any of a plurality of events and venues 90. For example, FIG. 3b shows an example of a baseball field template 120. Other exemplary venues 90 for which the storage module 50 may store templates 120 include basketball courts, soccer fields, tennis courts, football fields, swimming pools, car race tracks, horse race tracks, bicycle race courses, field hockey fields, golf courses, rugby fields, and volleyball courts, and so on. Further, processing device 30 may process video of other types of events such as award ceremonies, red carpet events, festivals, and so on.

The identification module 70 may be configured to identify a sub-portion of the video captured by camera(s) 20 based on the interest-ratings of the movable objects. That is, the identification module 70 may be configured to identify a sub-portion of the field of view of camera(s) 20 or the portion of the area captured by camera 20 based on the interest-ratings of the movable object. For example, FIG. 4 shows a camera 20m with a field of view 100m which captures video of substantially the entire playing area 90. In the example shown, the identification module 70 has identified a sub-portion of the field of view 100m captured by the camera 20m, or a cropped view 115, based upon the interest ratings of the players 110 at a particular point in time or time period. Accordingly, the sub-portion may include at least a segment of the captured video cropped to cropped view 115. Identification module 70 may define the sub-potion 115 as coordinates.

The sub-portion may include cropped frames from the captured video. Alternatively or in addition, the sub-portion may include stitched together segments from the captured video. For example, where the captured video is not broadcasted live, pauses in game play (e.g. at half time or between periods) may be cut from the captured video and the remaining segments stitched together to form the sub-portion.

In configurations of the system 10 which include multiple cameras 20, the sub-portion may include stitched together segments selected from video captured by each of the cameras 20. For example, the sub-portion may include chronological video segments selected from video captured by each of the cameras 20. Alternatively, the sub-portion may include simultaneous cropped views of video from the multiple cameras 20 arranged in a "picture-in-picture" or a mosaic fashion.

The identification module 70 may identify the sub-portion based upon one or more of the interest-ratings of the players 110 at any given point in time. For example, the identification module 70 may identify a sub-portion including cropped views 115 of the captured video where the view is always focused on the player 110 with the highest interest rating. Alternatively, the identification module 70 may identify sub-portion as a cropped view of the captured video which focuses on a group of players 110 with aggregated interest ratings which sum-total to a high value, even though none of the players 110 in the group have the highest interest rating in the sport event. The identification module 70 may identify sub-portion based on interest ratings of players based on defined rules that may vary during the sporting event or by type of sporting event.

The identification module 70 may be configured to operate within a set of operational constraints. For example, the identification module 70 may be configured to identify a sub-portion including a cropped view of the captured video that is updated at a prescribed interval. The cropped view may be constrained to a minimum and maximum size of the total field of view 100 of the camera 20. The cropped view may also be constrained to a minimum and maximum rate of change (e.g. so that viewers are not disoriented by fast changing views).

The identification module 70 may be configured to identify a sub-portion of the total field of view 100 of the camera 20 including a view that updates as often as every frame. For example, to follow a fast moving player 110, the identification module 70 may continuously update a cropped view of the captured video or sub portion of the total field of view 100 of the camera 20 to keep the view centered on the player 110. Processing device 30 may be configured with a predefined update period. For example the identification module 70 may be configured to identify an updated view for the sub-portion every few seconds or for a longer period of time. For example, in a wrestling match captured by multiple cameras 20, the identification module 70 may update which camera's 20 video feed to include in the sub-portion at multiple-second intervals.

The sub-portion of the original video feed from cameras 20 has a smaller field of view of the playing area 90 than the original captured video, or the cameras total field of view 100. The sub-portion may have a narrower field of view, a lower resolution, a shorter length, a lower bitrate, and so on as compared with the original captured video. In a configuration of the system 10 which includes multiple cameras 20, for example, the identification module 70 may identify a sub-portion including stitched together segments of video captured by each camera 20. In this example, the captured video includes simultaneous video channels from multiple cameras and has a bit rate and field of view that is the sum-total of the bitrates and fields of view of the constituent video channels. The sub-portion on the other hand, may have the bitrate and field of view of only one of the video channels at any one time, or a smaller field of view than the one video channel. Therefore the sub-portion in this example has a lower bitrate and field of view as compared to the captured video.

The identification module 70 may be configured to identify the portion of video of interest using additional interest indicia. For example, the identification module 70 is operable to determine a prominent area of interest through head movements of a local spectator, where a sensor on a hat or other item may transmit a position and direction they are looking. If a large number of spectators are looking at the same area the identification module 70 may use this data (e.g. additional interest indicia) to determine that the portion of the area where many spectators are looking is an area of interest.

The identification module 70 may also use external stimulus as additional interest indicia to identify portions of the area of that are of interest. For example, external triggers that can include sound (whistle, buzzer, crowd) outputs from the scoreboard/game, clock Zamboni on ice, opening and closing of Zamboni doors to indicated various activities in the game e.g. end of period, start of game, penalty called, flood may be detected and used by identification module 70 to determine where to focus the camera 20, which camera 20 to select, which portion of the video to broadcast or not, and so on. This method of determining information regarding the start of periods, stoppage in play, goals being scored involves the use of different technologies such as differentiating the sound of the buzzer used at the start of the game, and between periods to determine and relay information to the web interface and to store as bookmarks throughout the game. Also the ability to detect the entrance of the ice cleaning equipment onto the ice to determine a time within a game, in order to activate on screen advertising during this off-play.

The video processing module 82 may be configured to de-warp the video, resize the video, and perform other processing techniques on the captured video. For example, camera 20 may be a fish eye or panomorphic lens camera 20 and the captured video may require de-warping. The video processing module 82 may be configured to work with the identification module 70 to resize the captured video based on the sub-portion of the video identified using the interest-ratings of the players 110. The video processing module 82 may be configured with operational constraints that specify parameters for de-warping and resizing. The video processing module 82 may de-warp the video to provide a normalized video as output without the warping associated with the fish eye or panomorphic lens 20.

The transmission module 80 may be configured to transmit the sub-portion of video identified by the identification module 70 to any suitable recipient for any purpose. For example, the transmission module 80 may be configured to transmit the sub-portion to a broadcast system 52 for internet streaming, television broadcasting, post-processing and commercial insertion, DVD/Blu-ray publishing, and so on.

Figure 5:
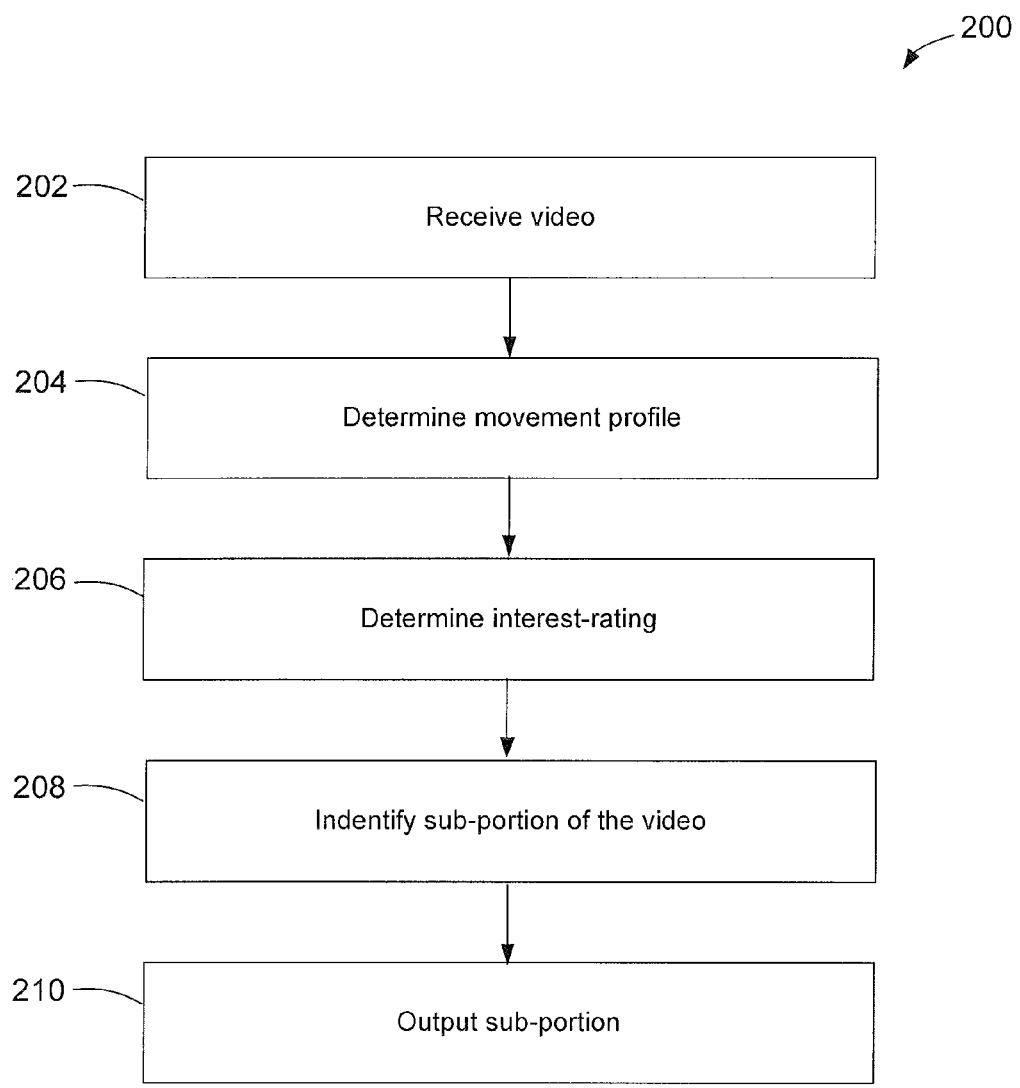
FIG. 5 illustrates an example method of processing sports event video in accordance with embodiments described herein.

Referring now to FIG. 5, an example method 200 of processing video of a sporting event is shown. The method 200 as shown may be performed using a system such as system 10 described above by way of example or my processing device 30.

In the example shown, the method 200 at 202 includes receiving video data of a sporting event taking place within a playing area 90. The video may be a single channel stream of video captured from a single camera 20 or may be a combined/multiplexed set of video streams captured from a plurality of cameras 20. Optionally, the video may be accompanied by camera information such as camera position, direction, field of view, and so on.

At 204, a movement profile for each of the players 110 may be determined or updated. For example, if a movement profile does not already exist for a player 110 then it will be created. Otherwise, if a movement profile already exists then it will be update. 200 will repeat periodically or in response to events to continuously update the players 110 movement profile as the players move throughout the sporting event and playing area 90. For example, the movement profile of only the players 110 visible in a given field of view 100 of a camera 20 or segment of captured video may be determined or updated. As another example, the movement profile of players 110 both within and outside of the field of view 100 of the camera 20 may be determined.

At 206, an interest-rating for each player 110 is determined based on a correlation between the movement profile of that player 110 and a template 120 as described herein, for example.

At 208, the sub-portion of the total field of view 100 of the camera 20 or captured video is identified based upon the interest-ratings of the players 110 as described herein. For example, the sub-portion may identified by locating a region that includes a group of players 110 with the highest aggregate interest-ratings, or by locating a region that includes a player 110 with the highest overall interest-rating.

At 210, the sub-portion is output to broadcast system 52, for example.

The processing device 30 may be used for motion tracking by constantly and continuously updating interest-rating factors associated with identified object (player) within a predefined area based on the absolute or relative position in relation to the playing surface, trajectory of the object, and so on. The processing device 30 may use analytic technology to identify players using normal lighting conditions and movement profile (such as a vector of movement along with velocity) by comparing two or more video frames. The frames being compared can be either adjacent to one another or several apart (for performance purposes as different configuration may work better in a real time environment). This object motion may then be related to a predetermined template to determine interest-ratings for objects (e.g. players) which when combined with interest-ratings for other object will determine an estimate for the area of the field of view, or screen, of the camera of most interest and processing device 30 may then recommend coordinates of a viewing window to broadcast (e.g. a sub portion of the field of view of the camera), without relying on human interaction. Templates may be designed specifically by type of sporting event in order to assist the processing device 30 determine the areas of interest for that particular viewing audience. For example, objects in a top left corner of the playing area with higher weighing factors may result in processing device determining a sub portion or view window (red box) to set focus on that area of the playing surface. As an example, the processing device 30 may interact with single hi-resolution camera equipped with a 360 panomorph lens (like a fisheye) with software, or the processing module 82, to dewarp the curved image, resize the image and so on. Using the software, processing device 30 may incorporate additional fixed cameras to provide a closer image of an area in a way that may not require change to surrounding software.

The processing device 30 may identify the sub portion of field of view to generate as output a reduced size of video data for reduction of bandwidth for broadcasting. That is, the processing device 30 may provide an automated feed of any sport event involving the using a high resolution source video and an automated process using a defined rule set involving the movement profiles and templates to provide a lower resolution video to conserve bandwidth for broadcast distribution. Processing device 30 determines a sub portion of a high resolution video with an estimated higher interest and crops the video to show only the sub portion area which may result in sending less video data through the communication medium.

Processing device 30 may process archived video to identify sub-portions based on different configuration parameters, such that the same source video data may be used to generate different sub-portions depending on the configuration parameters. For example, a particular player may be of interest and configuration parameters may identify that player and may always associate a high interest-rating with that player to ensure that player is visible in the sub-portion. That is, the sub-portion identified will substantially always try to include that player, such that the video will in effect be processed to follow that player throughout the playing area. As an illustrative example, this may be desirable for a parent or trainer to view video focusing on one specific player without requiring a camera specific to that one player.

Processing device 30 may also include an audio annotation module (not shown) for receiving audio data that may describe the sporting event, such as a play by play. The audio data may be saved and transmitted in association with the video data so that the timing of the audio data corresponds to the video data.

Processing device 30 is configured to automatically determine the sub-portion of video based on interest-rating factors and in some embodiments may use a hybrid technique that allows the sub-portion to be manually selected and identified at certain points in time of the sporting event. The processing device 30 may analyze the manually selected sub-portion using learning techniques to identify specific configurations of players 110 for use in determining and refining interest-rating factors and rating techniques, to further refine the automated identification of the sub-portion.

The scope of the claims should not be limited by the described embodiments and examples but should be given the broadest interpretation consistent with the description as a whole.

The invention claimed is:

1. A method of processing video to determine an optimal or near-optimal area of interest of the video to live broadcast, comprising:
receiving live video data of a playing area of a sporting event from at least one camera;
defining templates for the playing area independently of the live video data, each template defining a plurality of regions of the playing area and linking an interest rating factor to each region of the plurality of regions of the playing area;
determining a movement profile for each of a plurality of movable objects identified in the live video data by tracking the plurality of movable objects using at least one tracking technique not based on the live video data, wherein the movement profile defines the corresponding object's movement within the playing area of the sporting event over time, the movement profile comprising a trajectory of the object defined as a plurality of positions of the object within the playing area at a plurality of time points of the sporting event and at least one velocity at a time point of the plurality of time points;
determining, at one or more time points of the sporting event, an overall interest-rating for each movable object of the plurality of movable objects based on a correlation between the movement profile of that object and at least one region of at least one template of the templates of the playing area that the movable object is currently positioned in or moving towards at the one or more time points in the sporting event, the overall interest-rating comprising a combination of the interest rating factor linked to the at least one region of the at least one template and at least one additional interest rating factor derived from the movement profile of the movable object, the movement profiles of other movable objects, and contextual factors for the sporting event;
identifying, at the one or more time points of the sporting event, a sub-portion of the live video data of the playing area based on an aggregated interesting rating of a sum-total of a portion of the overall interest-ratings of the of movable objects being at least a high threshold value;
determining an action to control the at least one camera for selecting an optimal camera of the at least one camera or camera position for the at least one camera; and
broadcasting the identified sub-portion of the live video data of the playing area by triggering the action to control the at least one camera.

2. The method of claim 1, wherein the at least one camera has a field of view that comprises substantially all of the area and the method further comprises processing the video data based on the sub-portion of the area identified based on the interest ratings to identify one or more cameras of the at least one camera as the optimal camera.

3. The method of claim 1, wherein the received video data comprises a plurality of frames and the sub-portion of the area is used for processing the video data to generate a cropped area of each of the plurality of frames.

4. The method of claim 1, further comprising processing the video data to generate a video of the sub-portion of the area and outputting the video of the sub-portion of the area.

5. The method of claim 3, wherein the received video data comprises a plurality of frames, wherein plurality of frames of the received video data have a first resolution, and wherein the cropped area of each of the plurality of frames has a resolution less than the first resolution.

6. The method of claim 1, wherein the video data has a first bitrate and wherein the method further comprises processing the video data to generate a video of the sub-portion of the area, wherein the video of the sub-portion of the area has a second bitrate less than the first bitrate.

7. The method of claim 1, wherein the interest rating factors linked with the regions of the playing area are associated with the one or more of the position, the trajectory, the velocity and the speed of that object.

8. The method of claim 1, wherein the template comprises a venue-specific interest-rating factor for each region in the plurality of regions.

9. The method of claim 8, wherein determining an interest-rating for a movable object comprises:
comparing a position of the movable object in the trajectory of the movable object's movement profile with the plurality of regions to identify a region; and
modifying the interest-rating for the movable object based on the interest-rating factor for that region in the template.

10. The method of claim 8, wherein determining an interest-rating for a movable object comprises:
comparing the trajectory of the movable object in the object's movement profile with the plurality of regions to identify a region; and
modifying the interest-rating for the movable object by the interest-rating factor linked to that region in the template.

11. The method of claim 1, wherein the received video data comprises a first field of view, and the sub-portion of the area comprises a field of view that is less than the first field of view.

12. The method of claim 1, further comprising determining additional interest indicia as the contextual factors for the sporting event, wherein the sub-portion of the area is identified based on the additional interest indicia, the additional interest indicia comprising a time period for the sporting event and a stage for the sporting event.

13. The method of claim 1, wherein the templates define patterns of special movement and are linked to internal and external actions, wherein the correlation comprises pattern matching between the movement profiles and the templates.

14. The method of claim 1, wherein the at least one additional interest rating factors comprises at least the velocity of the object, the velocity of the other objects, direction of movement of the object, time lapsed in the sporting event, proximity of the object to the other objects, proximity of the object relative to the regions of the templates, stage of the sporting event, identity of the object, and other events.

15. The method of claim 1, wherein the method further comprises, based on a predefined update period, continuously identifying the sub-portion of the live video data of the playing area to generate updated views for updating the broadcasting.

16. The method of claim 1, wherein the method further comprises identifying, at the one or more time points of the sporting event, the sub-portion of the live video data of the playing area based on operational constraints selected from the group consisting of a minimum field of view size, a maximum field of view size, a minimum rate of change, and a maximum rate of change.

17. A system for processing video to determine an optimal or near-optimal area of interest of the video to live broadcast, comprising:
one or more cameras configured to capture live video data of a playing area of a sporting event; and
at least one processing device configured to:
determine movement profile for each of a plurality of movable objects identified in the live video data by tracking the plurality of movable objects using at least one tracking technique not based on the live video data, wherein the movement profile defines the corresponding object's movement within the area over time, the movement profile comprising a trajectory of the object defined as a plurality of positions of the object within the playing area at a plurality of time points of the sporting event and at least one velocity at a time point of the plurality of time points;
define templates for the playing area independently of the video data, each template defining a plurality of regions of the playing area and linking an interest rating factor to each of the plurality of regions of the playing area, and determine, at one or more time points of the sporting event, an overall interest-rating for each movable object of the plurality of movable objects based on a correlation between the movement profile of that movable object and at least one region of at least one template of the templates of the playing area that the movable object is currently positioned in or moving towards at the one or more time points in the sporting event, the overall interest-rating comprising a combination of the interest rating factor linked to the at least one region of the at least one template and at least one additional interest rating factor derived from the movement profile of the movable object, the movement profiles of other movable objects, and contextual factors for the sporting event;
identify, at the one or more time points of the sporting event, a sub-portion of the live video data of the playing area based on the overall interest-ratings of the movable objects being at least a high threshold value;
determining an action to control the at least one camera for selecting an optimal camera of the at least one camera or camera position for the at least one camera;
broadcast the identified sub-portion of the video data of the playing area by triggering the action to control the at least one camera; and
a storage device for storing the templates of the playing area.

18. The system of claim 17, wherein the one or more cameras are configured with a field of view that comprises substantially the entire area and the processing device is configured to process the video data based on the sub-portion of the area identified based on the interest ratings to identify at least one camera of the one or more cameras.

19. The system of claim 17, wherein the video data comprises a plurality of frames and the processing device is configured to identify a cropped area of each of the plurality of frames to be used for processing the video data to generate a video of the sub-portion of the area.

20. The system of claim 19, wherein the processing device connects to a transmission device configured to output the video of the sub-portion of the playing area.

21. The system of claim 19, wherein the one or more cameras are configured to capture the plurality of frames at a first resolution, and wherein the processing device is configured to identify the cropped area of each of the plurality of frames, wherein each of the cropped areas has a resolution less than the first resolution.

22. The system of claim 19, wherein the one or more cameras are configured to capture the video at a first bitrate and the processing device is configured to identify the sub-portion of the playing area to generate a video of the sub-portion of the area with a second bitrate less than the first bitrate for the broadcast.

23. The system of claim 17, wherein:
the template comprises a venue-specific interest-rating factor for each region in the plurality of regions; and
to determine the interest rating for each movable object, the processing device is configured to:
compare a location of the movable object in the trajectory of the movable object's movement profile with the plurality of regions to identify a region; and
modify the interest-rating for that movable object by the interest-rating factor for that region in the template.

24. The system of claim 17, wherein:
the template comprises a venue-specific interest-rating factor for each region in the plurality of regions; and
to determine the interest rating for each movable object, the processing device is configured to:
compare at least one of the trajectory, the velocity of the movable object in the object's movement profile with the plurality of templates to identify a template; and
modify the interest-rating of the movable object by the venue specific interest-rating factor for the template.

25. The system of claim 17, wherein the camera is configured to capture a first field of view, and the identification module is configured to identify the sub-portion of the area with a field of view that is less than the first field of view.

26. The system of claim 17, wherein the processing device is further configured to determine additional interest indicia, and wherein the processing device is further configured to identify the sub-portion of the area based on the additional interest indicia.

27. A non-transitory computer-readable storage medium storing one or more sequences of instructions which, when executed by one or more processors, causes the one or more processors to perform a method of processing video to determine an optimal or near-optimal area of interest of the video to live broadcast, the method comprising:
receiving live video data of a playing area of a sporting event from at least one camera;
defining templates for the playing area independently of the live video data, each template defining a plurality of regions of the playing area and linking an interest rating factor to each region of the plurality of regions of the playing area;
determining a movement profile for each of a plurality of movable objects identified in the live video data by tracking the plurality of movable objects using at least one tracking technique not based on the live video data, wherein the movement profile defines the corresponding object's movement within the area of the sporting event over time, the movement profile comprising a trajectory of the object defined as a plurality of positions of the object within the playing area at a plurality of time points of the sporting event and at least one velocity at a time point of the plurality of time points;
determining, at one or more time points of the sporting event, an overall interest-rating for each movable object of the plurality of movable objects based on a correlation between the movement profile of that object and at least one region of at least one template of the templates of the playing area that the movable object is currently positioned in or moving towards at the one or more time points in the sporting event, the overall interest-rating comprising a combination of the interest rating factor linked to the at least one region of the at least one template and at least one additional interest rating factor derived from the movement profile of the movable object, the movement profiles of other movable objects, and contextual factors for the sporting event;
identifying, at the one or more time points of the sporting event, a sub-portion of the live video data of the playing area based on an aggregated interesting rating of a sum-total of a portion of the overall interest-ratings of the movable objects being at least a high threshold value;
determining an action to control the at least one camera for selecting an optimal camera of the at least one camera or camera position for the at least one camera; and
broadcasting the identified sub-portion of the live video data of the playing area by triggering the action to control the at least one camera.

* * * * *